United States Patent
Poirier et al.

(10) Patent No.: US 11,655,171 B2
(45) Date of Patent: May 23, 2023

(54) APPARATUS AND METHOD FOR ELECTROCHEMICAL TREATMENT OF WASTEWATER

(71) Applicant: PROTERRGO INC., Montréal (CA)

(72) Inventors: Nicole Alice Poirier, Beaconsfield (CA); Valérie Leveillé, Montréal (CA)

(*) Notice: Subject to any disclaimer, the term of this patent is extended or adjusted under 35 U.S.C. 154(b) by 980 days.

(21) Appl. No.: 16/443,026

(22) Filed: Jun. 17, 2019

(65) Prior Publication Data

US 2019/0300411 A1 Oct. 3, 2019

Related U.S. Application Data

(60) Continuation of application No. 14/861,549, filed on Sep. 22, 2015, now abandoned, which is a division of
(Continued)

(51) Int. Cl.
*C02F 9/00* (2023.01)
*C02F 1/463* (2023.01)
(Continued)

(52) U.S. Cl.
CPC ............... *C02F 9/00* (2013.01); *C02F 1/463* (2013.01); *C02F 1/465* (2013.01); *C02F 1/4674* (2013.01); *C02F 1/76* (2013.01); *C02F 1/32* (2013.01); *C02F 2001/46138* (2013.01); *C02F 2103/002* (2013.01); *C02F 2103/005* (2013.01);
(Continued)

(58) Field of Classification Search
CPC ........................................................ C02F 9/00
See application file for complete search history.

(56) References Cited

U.S. PATENT DOCUMENTS 4,292,175 A * 9/1981 Krause .................. C02F 1/4674
204/237
6,391,209 B1 5/2002 Belongia et al.
(Continued)

FOREIGN PATENT DOCUMENTS

CA 2689646 A1 12/2008
GB 654728 A 6/1951
(Continued)

OTHER PUBLICATIONS

Australia application 2010268710, office action dated Sep. 2, 2014, with related claims 1-56.
(Continued)

*Primary Examiner* — Peter Keyworth

(57) ABSTRACT

The wastewater treatment apparatus of present invention has an electro-coagulation unit for removing contaminants with at least one anode and at least one cathode and an electro-oxidation unit for oxidizing contaminants with at least one anode and at least one cathode wherein oxidants are electrochemically generated. Based on the type of wastewater, the apparatus can have an electro-flotation unit between the electrocoagulation unit and the electro-oxidation unit. The apparatus also has an oxidant removal unit which can have a metal ion-liberating electrode for reacting with and removing residual oxidants. In some cases, portions of effluent from the oxidant removal unit can be recirculated to the electro-coagulation unit for increased efficiency.

22 Claims, 8 Drawing Sheets

Related U.S. Application Data application No. 13/381,173, filed as application No. PCT/CA2010/000930 on Jun. 23, 2010, now abandoned.

(60) Provisional application No. 61/221,522, filed on Jun. 29, 2009.

(51) Int. Cl.
| | | |
|---|---|---|
| *C02F 1/465* | (2023.01) | |
| *C02F 1/467* | (2023.01) | |
| *C02F 1/76* | (2023.01) | |
| *C02F 1/461* | (2023.01) | |
| *C02F 103/00* | (2006.01) | |
| *C02F 103/08* | (2006.01) | |
| *C02F 1/32* | (2023.01) | |

(52) U.S. Cl.
CPC .... *C02F 2103/008* (2013.01); *C02F 2103/08* (2013.01); *C02F 2201/4614* (2013.01); *C02F 2201/46135* (2013.01); *C02F 2201/46175* (2013.01); *C02F 2209/02* (2013.01); *C02F 2209/04* (2013.01); *C02F 2209/05* (2013.01); *C02F 2209/06* (2013.01); *C02F 2209/11* (2013.01); *C02F 2209/245* (2013.01); *C02F 2209/29* (2013.01); *C02F 2209/40* (2013.01)

(56) References Cited

U.S. PATENT DOCUMENTS

| | | | |
|---|---|---|---|
| 6,960,301 | B2 | 11/2005 | Bradley |
| 2002/0185446 | A1 | 12/2002 | Johnny |
| 2003/0173300 | A1 | 9/2003 | Bradley |
| 2003/0205535 | A1 | 11/2003 | Roth |
| 2004/0206624 | A1 | 10/2004 | Hosonuma |
| 2004/0219090 | A1 | 11/2004 | Dziedzic |
| 2005/0230321 | A1 | 10/2005 | Berrak |
| 2006/0016689 | A1 | 1/2006 | Carson |
| 2007/0199868 | A1 | 8/2007 | Volpe |
| 2008/0105551 | A1 | 5/2008 | Wang |
| 2009/0026088 | A1 | 1/2009 | Sumida et al. |

FOREIGN PATENT DOCUMENTS

| | | | |
|---|---|---|---|
| JP | S51-103082 | A | 9/1976 |
| JP | S51-128152 | A | 11/1976 |
| JP | S57-65399 | A | 4/1982 |
| JP | 2000210670 | A | 8/2000 |
| JP | 2003-535223 | A | 11/2003 |
| JP | 2005-076103 | A | 3/2005 |
| JP | 2006175398 | A | 7/2006 |
| KR | 10-1995-0032646 | A | 12/1995 |
| KR | 10-2009-0057771 | A | 6/2009 |
| WO | WO 2007/065228 | A1 | 6/2007 |
| WO | WO 2008/150541 | A1 | 12/2008 |

OTHER PUBLICATIONS

EP10793456 office action dated May 22, 2015 with related claims 1-15.
EP10793456 Supplementary European Search Report dated Dec. 10, 2012.
EP10793456 Written Opinion dated Dec. 10, 2012.
GC application 2010-16181, office action dated Nov. 18, 2014 with related claims 1-54.
Guohua Chen, Electrochemical Technologies in Wastewater Treatment, Eco Asia Conference (Oct. 29, 2008).
Guohua Chen, Electrochemical technologies in wastewater treatment, Separation and Purification Technology, Elsevier Science, Amsterdam,NL, vol. 38, No. 1, Jul. 15, 2004, pp. 11-41.
Japan application 2012-517985, office action dated Jul. 22, 2014, with related claims 1-15 and comments of japanese agent.
Martínez-Huitle et al, Conductive diamond electrodes for water purification, Mat. Res. vol. 10 No. 4 São Carlos Oct./Dec. 2007.
Pazzina et al., Application of Boron-Doped Diamond Electrodes for Wastewater Treatment, J. Environ. Eng. Manage., 18(3), 139-153 (2008).
PCT A34 Amendment in PCT/CA2010/000930 dated Apr. 29, 2011 with related claims.
PCT/CA2010/000930 international search report dated Nov. 1, 2010.
PCT/CA2010/000930 IPRP with related claims 1-56 dated Oct. 14, 2011.
Raju et al. (2008) Treatment of wastewater from synthetic textile industry by electrocoagulation-electrooxidation. Biochemical Engineering Journal, 144 (1). pp. 51-58.
Sheng H. Lin et al., Continuous treatment of textile wastewater by combined coagulation, electrochemical oxidation and activated sludge, Water Research, vol. 30, Issue 3, Mar. 1996, pp. 587-592.
Zabolotsky V I et al, Electrodialysis technology for deep demineralization of surface and ground water, Desalination, Elsevier, Amsterdam, NL, vol. 108, No. 1, Feb. 1, 1997, pp. 179-181.
Alfaro, M.A.QL et al. "Boron Doped Diamond Electrode for the Wastewater Treatment". Journal of the Brazilian Chemical Society. vol. 17, Issue 2. Mar. 3, 2006. pp. 227-236(year: 2006).
CA application 2,766,832 Office Action dated Mar. 19, 2015.
CA application 2,766,832 Office Action dated Nov. 26, 2015.
CA application 2,766,832 Office Action dated Sep. 16, 2016.
CA application 2,766,832 Office Action dated May 25, 2017.
CN application 201080029442.9 Office Action dated Jun. 20, 2013.
CN application 201080029442.9 Office Action dated Feb. 5, 2014.
CN application 201080029442.9 Office Action dated Jul. 11, 2014.
EP10793456 office action dated Feb. 8, 2016.
JP application 2012-517985 Office Action dated Jul. 22, 2014.
JP application 2012-517985 Office Action dated Apr. 28, 2015.
KR application 2012-7002456 Office Action dated Mar. 30, 2016.
Moreno et al. "Electrochemical reaction for electrocoagulation using iron electrodes" Industrial & Engineering Chemistry Research. Mar. 4, 2009. vol. 48, Iss. 5. pp. 2275-2282.
Panizza et al. "Direct and mediated electrochemical oxidation of naphtalen- and anthraquinon-sulfonic acids" The Electrochemical Society Meeting Abstracts. Apr. 29, 2003.
PCT/CA2010/000930 written opinion dated Nov. 1, 2010.
U.S. Appl. No. 13/381,173 Office Action dated Dec. 20, 2013.
U.S. Appl. No. 13/381,173 Office Action dated Jul. 15, 2014.
U.S. Appl. No. 13/381,173 Office Action dated Feb. 20, 2015.
U.S. Appl. No. 14/861,549 Office Action dated Apr. 25, 2016.
U.S. Appl. No. 14/861,549 Office Action dated Oct. 7, 2016.
U.S. Appl. No. 14/861,549 Office Action dated Oct. 5, 2017.

* cited by examiner

APPARATUS AND METHOD FOR ELECTROCHEMICAL TREATMENT OF WASTEWATER

The present application is a continuation of U.S. patent application Ser. No. 14/861,549 filed on Sep. 22, 2015, which is a division of U.S. patent application Ser. No. 13/381,173 filed on Mar. 6, 2012 now abandoned, which is a national phase of International PCT Application No. PCT/CA2010/000930 filed on Jun. 23, 2010 designating the United States now expired, which claims priority of U.S. patent application No. 61/221,522 filed on Jun. 29, 2009, that are incorporated by reference herein.

TECHNICAL FIELD

The present invention relates to the field of wastewater treatment. More specifically, it relates to apparatuses and processes for the electrochemical decontamination of wastewaters.

BACKGROUND

There are many instances where small communities, enterprises and groups of people do not have access to (or for various reasons are unable to use) municipal wastewater treatment systems. Examples include isolated habitats, ships and marine platforms, small islands, research or military outposts, remote agricultural or industrial operations and point sources of wastewater.

These various communities generate a wide range of liquid waste including graywater, blackwater, sewage, oily water, and any other wastewater contaminated with pathogens, organic and inorganic material, dissolved or suspended solids.

Amongst these small communities are watercrafts which generate a multitude of wastewater streams. These streams comprise bilge water from the engine room, blackwater from toilets and urinals, and graywaters from showers, laundry, galleys and kitchen rooms.

Local and international land-based effluent discharge regulations as well as maritime effluent discharge standards are becoming more stringent. The land-based regulations are becoming more stringent especially for habitats located near body of water where contaminants such as phosphates, nitrates, and fecal coliforms are of major concern.

The international maritime regulations and other regulatory bodies are also becoming more stringent for contaminants such as oil, fecal coliforms, biological oxygen demand, chlorine as well as nutrients such as phosphorus and ammonia in sensitive waters due to their negative impact on the ecosystems. In fact, in many maritime areas, watercraft-generated wastewater can no longer be discharged without prior treatment.

There exist prior art references describing the need for ship-based chemical-free water treatment systems such as that taught by Leffler et al. in U.S. Pat. No. 6,923,901 and US Pub. No. 20040099607. Leffler et al. teach using air and electricity to generate reactive gaseous oxygen and nitrogen ionic species that will help decontaminate various water streams such as those originating from ballast, toilet and laundry room. The systems of Leffler et al. also teach using salt water to generate chlorine from electrolysis of salt in water for disinfection purpose.

Several prior art references describe using various combinations of electro-chemical devices which act in specific sequences to produce decontaminated effluents. For example, Mehl (U.S. Pat. No. 7,354,509) teaches a wastewater treatment system that effectively considers space requirements and effluent quality through the sequential steps of electro-coagulation, rotating energized magnetic media filter system, UV-based sterilization and a final sedimentation step.

Bradley (U.S. Pat. No. 6,960,301) teaches a system for leachate and wastewater remediation comprising an initial filtration screen to remove larger particles followed by ozone pretreatment, an electro-coagulation unit for flocculating particles, an oxidation unit and a polishing unit for removing leftover ammonium contaminants using an ion-exchange unit.

There is, however, a need for a compact apparatus and method capable of simultaneously treating complex and/or heterogeneous streams without the use of chemical addition, biological treatment or the generation of highly oxidising gases and with full automation and on/off capability. Such an apparatus could be used in applications where space is limited, in remote communities with no access to centralized wastewater treatment systems, in communities generating wastewater that cannot be discharged to available wastewater treatment systems, and for wastewater streams containing contaminants that are not removed or degraded by conventional treatment approaches (e.g. pharmaceutical residues). Thus, the apparatus and method would overcome the limitations and drawbacks of the prior art.

SUMMARY

It has been discovered that a simple-to-use system called Wastewater Electrochemical Treatment Technology (WETT) based on electrochemical process units requiring only electricity to operate and periodic low-cost electrode replacement can efficiently treat individually or simultaneously heterogeneous wastewater streams. Important characteristics of this system are that it is omnivorous and does not require the addition of external chemicals, treatment agents or biological treatment. Another important feature of WETT is that it is fast compared to biological treatment and many other treatment approaches.

Unlike most wastewater treatment technologies, Applicant's system is an omnivorous system able to treat several and different wastewaters rendering it safe for re-use or discharge to the surrounding environment. Whereas many wastewater treatment approaches are able to treat only one type of wastewater, Applicant's technology was designed as a sequential process that systematically removes most types of contaminants beginning with the easiest (usually large-sized or easily recovered) all the way to the most difficult (usually small-sized, dissolved or recalcitrant).

Unlike most wastewater treatment technologies, Applicant's system does not use chemicals, which are expensive and require safe handling and storage (many remote communities cannot afford these and/or do not have access to regular shipments) or biological treatment (many remote communities do not have trained personnel, the available space, or appropriate conditions to operate these systems, which can be easily upset).

It is therefore an object of the present invention to provide an apparatus for treating wastewater comprising an electro-coagulation unit to remove contaminants from a wastewater comprising at least one inlet to receive wastewater and at least one anode and at least one cathode, the anode and the cathode being connected to an electric source; and an electro-oxidation unit to oxidize contaminants in the wastewater comprising at least one inlet to receive the wastewater from the electro-coagulation unit, at least one anode and, at least one cathode wherein oxidants are electrochemically generated, at least one outlet to evacuate wastewater; and an oxidant removal unit to remove oxidants from the wastewater comprising at least one inlet to receive the wastewater from the electro-oxidation unit, a vessel to contain the wastewater during the oxidant removal process and at least one outlet adapted to either discharge treated wastewater from the apparatus or return treated wastewater to the electro-oxidation unit forming a closed loop circuit for treated wastewater recirculation.

In some embodiments of the present invention, the apparatus further comprises a reverse osmosis unit or an evaporation-condensation unit after the oxidant removal unit, wherein the additional unit is able to generate potable water.

It is another object of the present invention to provide an oxidant removal apparatus for removing oxidants from wastewater comprising at least one inlet to receive the wastewater. In addition, an oxidant removal vessel comprising at least one anode and at least one cathode connected to an electric source, wherein at least one anode is a metal anode adapted to release into the wastewater metal ions that react with residual oxidants to form metal oxides, and wherein the apparatus is adapted to separate metal oxides from the wastewater; a controller that receives input from at least one of an oxido-reduction potential sensor and a chlorine sensor to determine the level of oxidant removal; and an outlet to evacuate treated effluent.

It is yet another object of the present invention to provide a device for controlling an oxidation reaction in a wastewater treatment system as a function of one or more of $CO_2$, pH, chlorine and ORP measurements comprising an oxidation chamber adapted to allow oxidation of wastewater contaminants and one or more of a $CO_2$, pH, chlorine and ORP sensor in fluid communication with the oxidation chamber which sends input relative to the amount of $CO_2$, pH, chlorine and ORP to an oxidation chamber controller for controlling treatment level and/or progression.

It is yet another object of the present invention to provide a process for treating wastewater comprising electro-coagulating contaminants of the wastewaters in an electro-coagulation unit; and electro-oxidizing contaminants of the wastewater in an electro-oxidation unit; and liberating metal ions from an electrode to react with residual oxidants and produce metal oxides that can be separated from the wastewater in an oxidant removal unit; and finally, discharging a treated effluent. In certain cases, such as when a small quantity or known residual oxidants are discharged from the electro-oxidation unit, the metal ion liberating electrode of the oxidant removal unit can be replaced by a source of ultraviolet radiation for oxidant decomposition.

In some aspects of the present invention, there is provided a method for treating wastewater comprising submitting the wastewater to an oxidation step; and submitting oxidized wastewater to an oxidant removal step by passing the wastewater between electrodes connected to an electric source, the electric source causing an at least one sacrificial electrode to release metal ions into the wastewater wherein the metal ions will react with oxidants to generate metal oxides.

In some aspects of the present invention, there is provided a method for treating a wastewater containing oxidants comprising submitting the wastewater to an oxidant removal step by passing the wastewater in a recirculation loop between electrodes connected to an electric source, the electric source causing at least one sacrificial electrode to release metal ions into the wastewater wherein the metal ions will react with oxidants to generate metal oxides; measuring the oxidant level in the wastewater with an ORP and/or a chlorine sensor and finally discharging the wastewater as a function of the amount of oxidants in the wastewater.

In yet other aspects of the present invention, there is provided a method for controlling an oxidation reaction in an oxidation chamber comprising oxidizing contaminants in an oxidation chamber and measuring one or more treatment indicators that are indicative of the treatment progress such as ORP, free chlorine, pH and carbon dioxide; and then adjusting the oxidation reaction as a function of the treatment indicators.

In some aspects of the present invention, there is provided an apparatus comprising a loop between an oxidant removal unit and any other upstream electrochemical unit such that metal oxide-containing wastewater from the oxidant removal unit can be delivered to the upstream location to enhance coagulation and adsorption of natural organic or other matter, further increasing energy efficiency of the system.

BRIEF DESCRIPTION OF THE DRAWINGS

The invention will be better understood by way of the following detailed description of embodiments of the invention with reference to the appended drawings, in which.

DETAILED DESCRIPTION

Figure 1:
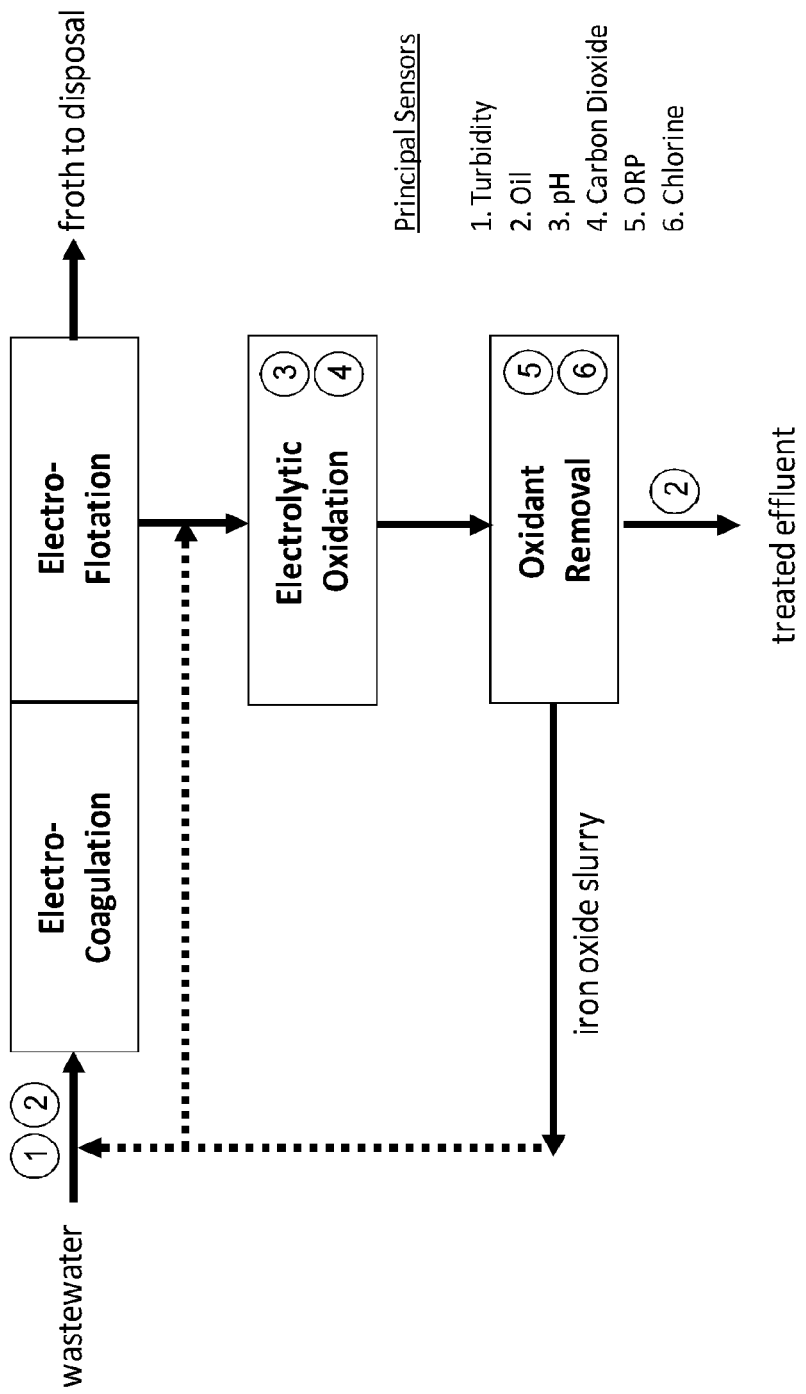
FIG. 1 is a schematic representation of the WETT process including treatment units for electro-coagulation, electro-flotation, electro-oxidation and oxidant reduction, the principal online sensors used and the recycling of iron oxide.

FIG. 1 is a schematic representation of the WETT process including the various electrochemical treatment units, the principal online sensors that may be used and the recycling of iron oxide to previous electrochemical treatment units (shown as dashed line). Not shown in FIG. 1 is a pre-treatment unit to remove bulk solids or free oil that may be required depending on the concentration of bulk solids and oil in the wastewater to be treated. Well-known equipment such as bar screens, coarse filters, and oil coalescers can be used to accomplish this task. The pre-treatment unit can also be a mechanism to reduce bulk solid size, such as a grinder.

The WETT units that may be involved in wastewater decontamination processes are listed below as well as in FIG. 1. In one preferred embodiment, the process consists of a series of four electrochemical units:

| 1. Electro-coagulation | (EC) |
| 2. Electro-flotation | (EF) |
| 3. Electrolytic Oxidation | (EO) |
| 4. Oxidant Removal | (OR) |

Some of the above units such as electro-coagulators are, individually, known in the prior art, while others, such as oxidant removal units are novel. Applicant's invention resides in the arrangement, operation and control of each of these units for the treatment of various wastewaters without the use of chemicals or biological treatment and involves many innovative aspects which make WETT a unique and previously unknown process and apparatus.

It will be appreciated that wastewater is meant to include all influent and effluent streams or liquids that can benefit from an electro-chemical treatment according to the present invention. It will also be appreciated that electro-coagulation should be interpreted as encompassing electro-flotation in such cases where electro-coagulation generates gas bubbles able to cause certain contaminants to float to a surface of a liquid.

Additionally, a particular arrangement and mode of operation will be described which is able to simultaneously treat the three principal waste streams (blackwater, graywater and oily water) generated onboard a ship; current state of the art provides systems and methods which can only treat certain streams individually or certain combinations of streams using separate equipment.

Each of the parts of the WETT process, illustrated schematically in FIG. 1, will be discussed in more detail below.

Electro-Coagulation (EC)

Applicants use the electro-coagulation process to destabilize the suspended solids, colloids, metal ions, oil and emulsions contained in the wastewater and coagulate them. EC consists of applying a voltage to one or more pairs of metal electrodes (usually aluminum or iron) immersed in the wastewater to be treated. The anode or anodes are sacrificial and release metal ions which have a coagulating effect. Simultaneously, hydrogen gas bubbles are created at the cathode or cathodes; depending on the geometry and flow direction of the wastewater, these can be used to float coagulated contaminants (including the liberated metal ions) to the surface of the liquid being treated. Polarity reversal of the electrodes, which is known to persons skilled in the art, prevents deposit formation on the cathode (or cathodes) surface and thus extends the lifetime of the electrodes and minimizes the electrical loss in the electro-coagulation unit.

The preferred embodiment of an electro-coagulation unit uses vertical aluminum parallel electrode plates but any other arrangement of the EC unit electrodes that allow for the coagulation of contaminants will do. Wastewater is pumped into the unit from the bottom, and upwards between the electrode plates, where coagulating metal ions are released and bubble generation occurs. The electrode plates can be placed in the flocculation tank or separate from it to facilitate their maintenance and replacement. The turbulence caused by the release of the gas bubbles at the cathode causes the coagulated particles to flocculate, and the adhesion of the bubbles to the flocs combined with the upward flow causes the flocculated contaminants to form a froth at the surface of the liquid. This froth is removed continuously by suction or any other froth removal mechanism such as skimmer blades, and if dewatering is required, the concentrated froth is sent to waste disposal and the liquid extracted from froth dewatering is sent back to the head of the wastewater treatment system or into any individual unit including EC, EF, EO or OR. Current densities and specific surface areas used are typical for the art, and the mode of operation is continuous, although this process can easily be operated in batch mode. An arrangement requiring the replacement of the electrodes assembly every few months or so is preferred. All of the electro-chemical units can utilize pulsed current in order to either reduce power consumption or enhance treatment efficiency.

Electro-Flotation (EF)

Applicants use this process as a polishing stage to float the flocs which were not removed during EC treatment. Although FIG. 1 depicts EC and EF units as separate compartments, the EF unit can be integrated into the EC unit. The purpose of the EF unit is to provide micron bubbles of gas which serve to float the flocs remaining in solution after EC treatment. The bubbles of hydrogen and oxygen are generated electrochemically using non-sacrificial electrodes, to which a current is applied. In this instance, a titanium mesh is used for the cathode while the anode consists of a titanium mesh coated with iridium oxide. Any other type of electrode materials, such as platinum coated titanium for both anode and cathode, can be used as long as it performs its EF requirements and allows for reversing polarity. Furthermore, other EF units are possible where the cathode releases micro-bubbles while the sacrificial anode releases coagulating agents.

The mode of operation is continuous. After EC/EF treatment, most of the suspended solids, metal ions, free and emulsified oils have been removed along with a good portion of the dissolved solids, as represented by the Chemical Oxygen Demand (COD) in the solution. Polarity reversal of the electrodes can also be used in this unit to prevent deposit formation on the cathode surface.

Electrolytic Oxidation (EO)

Applicants use this process to oxidize the remaining dissolved materials comprising Chemical Oxygen Demand. Electrolytic (or Electrochemical) Oxidation is an electro-chemical process that makes use of pairs of electrodes to which a current is applied. This produces oxidizing species on the surface of the anodes and/or in the bulk solution. The complete oxidation of organic molecules results in the liberation of carbon dioxide ($CO_2$) gas; the process is thus sometimes referred to as electrochemical combustion. Inorganic molecules can also be oxidized with this process. In addition to the $CO_2$ gas, hydrogen gas (created at the cathode) and small quantities of other gases such as oxygen at the anode are produced and vented continuously during the EO treatment. The cathode can be made from a material that does not allow for the generation of hydrogen gas in the EO unit as this could facilitate the determination of $CO_2$ levels and remove the requirement for venting of the hydrogen gas in the electro-oxidation unit.

The EO process makes use of electrodes consisting of a Boron Doped Diamond (BDD) coating over a silicon, titanium or other substrate. These can be enclosed in a stainless steel or plastic reactor body. The EO electrodes can also be made of a pure BDD plate by techniques such as thin-film chemical-vapour deposition. Polarity reversal to prevent deposit formation on the cathode surface is possible when both anodes and cathodes are BDD electrodes. BDD electrodes have a high capacity for creating hydroxyl radicals near the anode surface, although there are a few other types of electrodes with similar capabilities that could also be used. Hydroxyl radicals are more powerful than most of the well-known oxidants such as chlorine and ozone.

As well, BDD electrodes create a significant level of oxidative compounds in the bulk solution when salts (or seawater) are present in the wastewater being treated. In particular, the creation of sodium hypochlorite, which in equilibrium with hypochlorous acid depending on the solution pH, acts in combination with the hydroxyl radicals to oxidize dissolved contaminants, inactivate pathogens such as bacteria, and augment the rate and extent of oxidation that could be achieved using hydroxyl radicals only.

This process is typically operated in a batch recirculation mode since hydroxyl radicals are short-lived and remain close to the anode surface rather than entering the bulk flow. At high concentration of contaminants, the process is current-limited, but as the concentration of contaminants decreases below a certain level, the oxidation by hydroxyl radicals becomes mass transfer limited; many passes through the EO reactor are required to reduce the COD to low levels. However, when other oxidants are present in solution, such as sodium hypochlorite generated from the electrolysis of saltwater or seawater, enough oxidation might occur in the bulk flow to enable the EO process to operate in continuous mode. Therefore, depending on the operating conditions and desired level of COD reduction, a continuous mode of operation for the EO process is also possible. It is desirable to design the EO process in such a way as to minimize the specific surface area and the electrical consumption required for treatment.

Oxidant Removal (OR)

Figure 2:
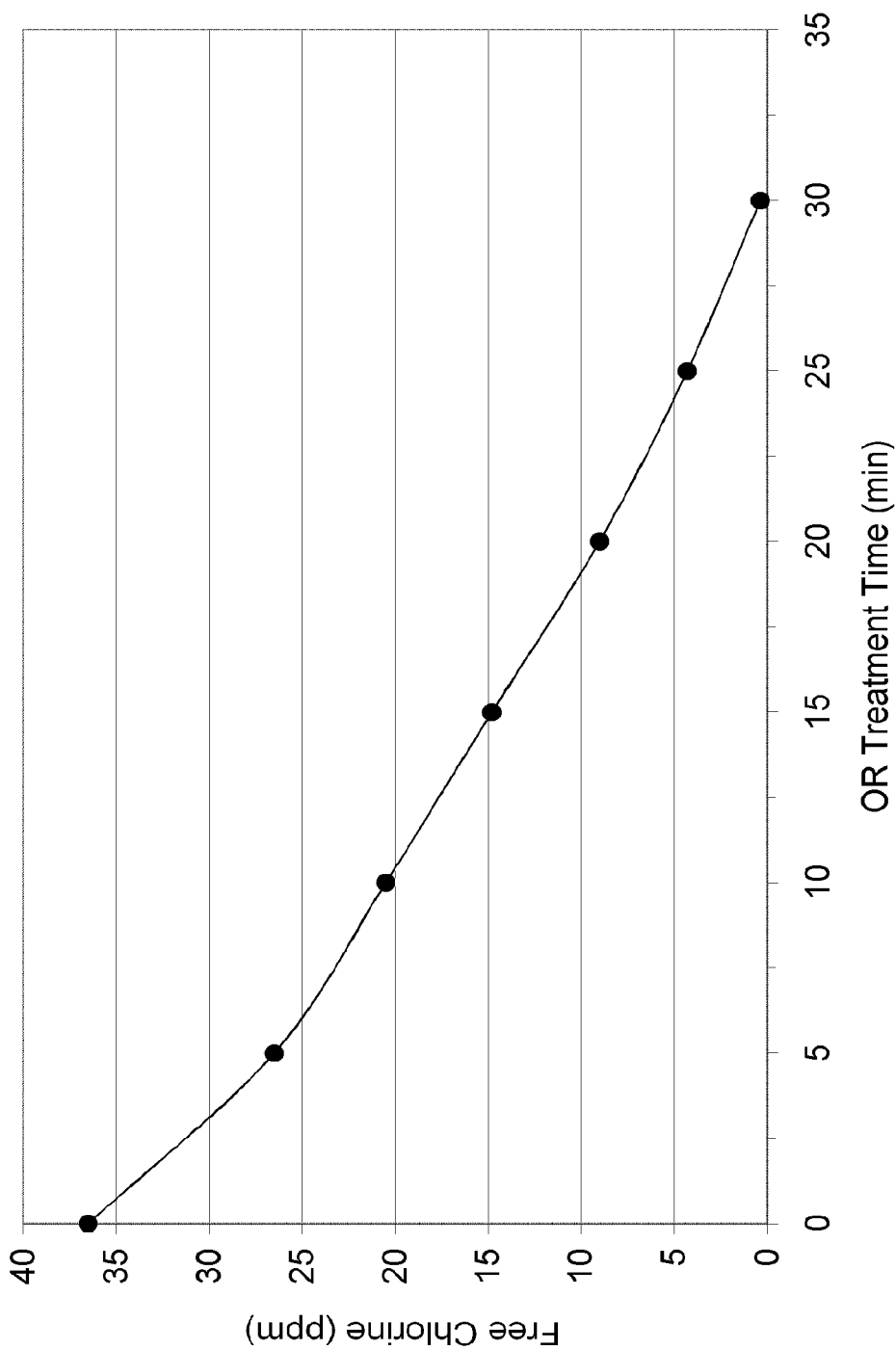
FIG. 2 is a graph showing the free chlorine removal with respect to treatment time with a lab-scale Oxidant Reduction (OR) unit operating at 30 mA.
Figure 3:
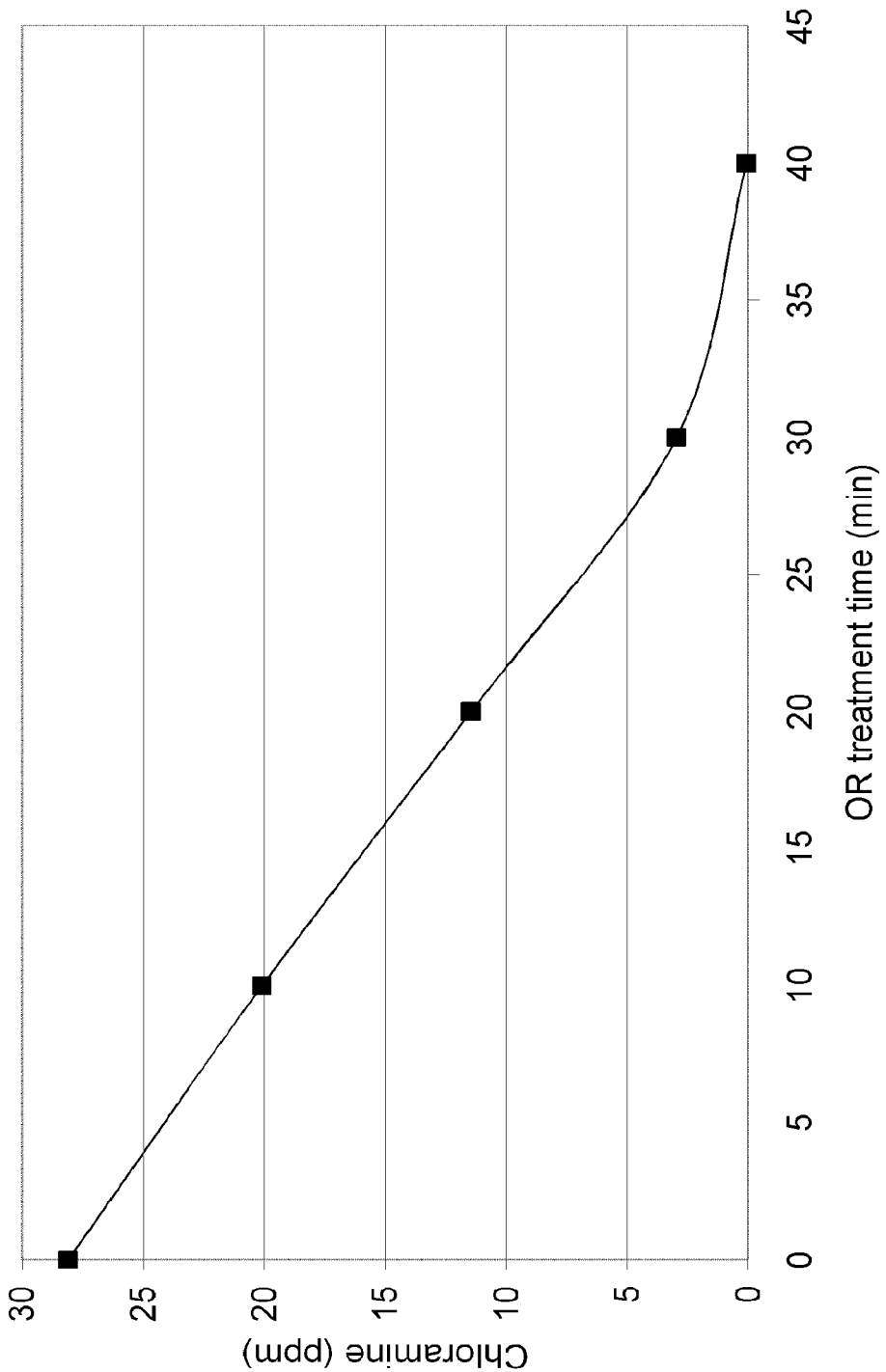
FIG. 3 is a graph showing the chloramine removal with respect to treatment time with a lab-scale Oxidant Reduction (OR) unit operation at 15 mA.

This is the final unit operation in the WETT process. Its function is to decompose the residual oxidant remaining after the EO treatment for those cases where this is required (most cases). For example, International Maritime Organization (IMO) and Convention for the Prevention of Pollution from Ships IMO/MARPOL regulations prohibit marine vessels from discharging treated wastewater containing residual chlorine oxidant >0.5 mg/L. If seawater is present in one of the wastewaters or added to improve conductivity of the wastewater, and an electrolytic process is used for oxidation, chlorine-based oxidants will be created and there will typically be a chlorine level above the IMO/MARPOL discharge standards when levels of COD acceptable for discharge are attained. The total chlorine value consists of the sum of free chlorine and combined chlorine (generally chloramines), and unlike other approaches the Applicant's approach is able to decompose both types of chlorine-based oxidants, as well as other types of oxidants that may be created by an electrolytic process (e.g. bromine-based) or added as a chemical or gas. FIGS. 2 and 3 present typical results for free chlorine and chloramine reduction using a lab-scale OR unit.

In the prior art, dechlorination through the use of well-known chemical reducing agents, granular activated carbon, catalysts or other such consumables is described. There are many drawbacks to these approaches, including their high cost and the safety precautions required for the handling and disposal of chemical products, and the fact that many isolated communities cannot obtain these dechlorinating agents on a regular basis.

Instead, in keeping with the electrolytic approach forming the core units of WETT, Applicants developed an electrolytic approach for the removal of residual oxidant that is inexpensive and rapid.

The OR unit operation makes use of parallel electrode plates mainly made of iron (such as carbon steel) to which a current is applied. The electrodes are encased in a stainless steel reactor, and the fluid to be treated is circulated through the reactor until the desired level of oxidant removal is attained. Alternatively, the electrode stack could be placed inside a holding tank of appropriate material of construction in which the wastewater is held and stirred. The mode of operation is batch although depending on the residual oxidant concentration and other particulars a continuous operation could be envisaged.

The current applied to the electrodes has the effect of liberating $Fe^{2+}$ ions from the anodes, which react instantaneously with residual oxidant to create $Fe(OH)_3$, an insoluble precipitate at neutral pH also known as rust. As an example, the oxidant sodium hypochlorite oxidizes the $Fe^{2+}$ ions to $Fe^{3+}$ ions while itself is reduced to harmless sodium and chloride ions (dissolved NaCl or salt). The rate of oxidant removal is principally determined by the concentration of oxidants and $Fe^{2+}$ liberated in the water, the later being a function of current density, whereas the extent of oxidant removal is a function of treatment time and rate.

Alternatively, oxidant removal can also be achieved by other methods such as granular activated carbon, ion exchange, a filter, chemical reducing agents, an aeration device, a heating device for thermal decomposition of the oxidants and ultraviolet (UV) radiation. For example, in an alternate embodiment of an Oxidant Removal apparatus, a source of UV radiation decomposes chlorine and other oxidants generated in the EO apparatus.

As with the EC anodes, it is preferred to size the sacrificial OR electrodes so that their replacement is required every few months or so with polarity reversal in operation. Depending on the intended use of the treated effluent, a small quantity of residual oxidant is sometimes desirable (for example as is done in municipal wastewater treatment systems); in this case the OR process is terminated before decomposing all of the residual oxidant.

The extent of removal (if any) of the $Fe(OH)_3$ particles from the treated effluent also depends on the final intended use of the treated effluent. The removal of iron from drinking water is a common practice because of aesthetic concerns (related to taste, staining or accumulation) rather than danger to human health or the environment. Iron is in fact essential for good human health, and when iron is present in drinking water it can be found at concentrations as high as 40 ppm (often in well water) although it is usually less than 10 ppm. However, for aesthetic reasons, the recommended limit is 0.3-1.0 ppm.

For the case of a naval vessel, the discharge of small amounts of rust particulates into the ocean should be of little concern; in fact, large amounts of glass and metal waste are regularly crushed onboard ships to ensure that they will not float prior to dumping them into the ocean. Furthermore, oceanographers hypothesize that lack of iron causes barren areas in the ocean, and many large-scale field experiments involving seeding the ocean with iron have been performed.

For those cases where it is desirable to remove the $Fe(OH)_3$ particles, several approaches can be used depending on the $Fe(OH)_3$ concentration, TSS discharge standard, and various other factors.

When the concentration of $Fe(OH)_3$ particles is large, a clarifier can be used to separate $Fe(OH)_3$ particles from the treated wastewater. The clarifier can operate in batch or continuous mode depending on the application. It has been found that for the typical levels of oxidant reduction required by the WETT process, the concentration and particle size distribution of $Fe(OH)_3$ is in some cases sufficient to allow for a reasonable rate of settling of the particles which can be removed in a concentrated slurry from the bottom of a clarifier operating in batch mode by opening a valve located in the exit pipe attached to the clarifier cone-shaped bottom. The flow during this period is designed to be laminar so as to minimize swirling or turbulence in the settled liquid.

For applications where the $Fe(OH)_3$ concentration is high and solids need to be highly concentrated, equipment such as a hydrocyclone, filter press or rotary drum filter can be employed. Alternatively, when the $Fe(OH)_3$ concentration is low, a backwash filter or other filtration means can be used to remove the particles and produce a clear stream and a slurry containing a high concentration of $Fe(OH)_3$ particles. The slurry containing the $Fe(OH)_3$ particles can be either sent to disposal or routed back to the untreated or partially-treated wastewater stream where it provides significant advantages as described below.

WETT Process Description

Figure 4A:
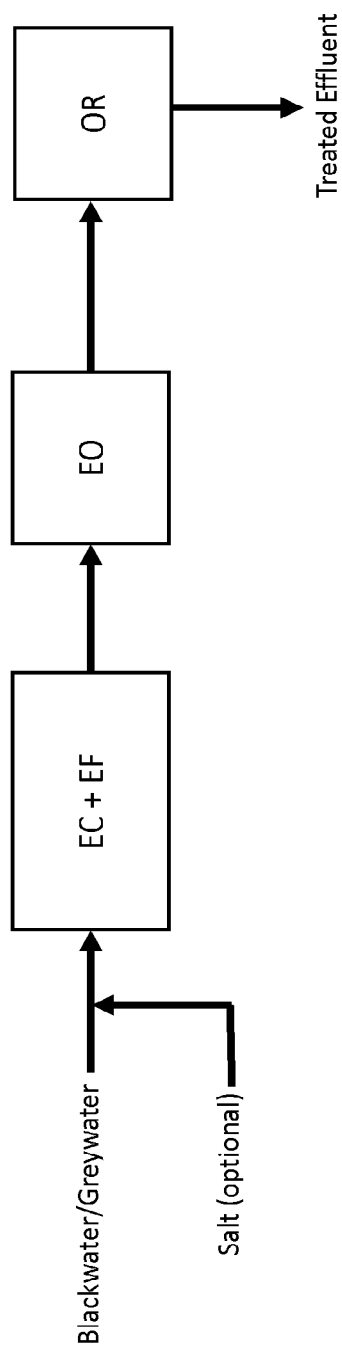
FIG. 4A is a schematic representation of a WETT unit for the treatment of Blackwater/Greywater.

In the case of combined blackwater (BW) and graywater (GW) or oily water (OW) streams, the wastewater to be treated can simply pass through each of the WETT units, as shown in FIG. 4A. Most wastewater streams are sufficiently conductive to operate the process, and the hydroxyl radicals generated during EO are sufficient to reduce COD and biological agents in solution even without the contribution of chlorine-based oxidants typically generated in approaches based on the electrolysis of saline solutions.

The addition of salt (or seawater or brine from a reverse-osmosis desalination process) can be used as required to increase electrical conductivity of the wastewater being treated by the WETT process. This salt addition will have to be minimal to prevent the generation of excessive amounts of chlorine-based oxidants.

Figure 4B:
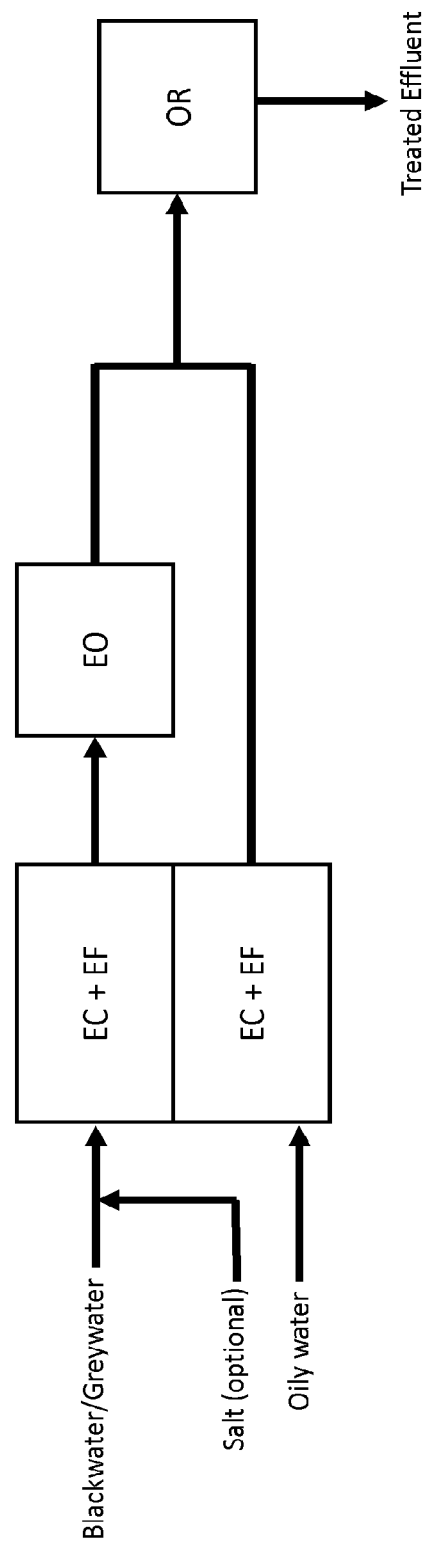
FIG. 4B a schematic representation of a WETT unit for the treatment of Blackwater/Greywater with an oily water component.

The approach described in FIG. 4A is capable of producing effluent meeting all of the IMO/MARPOL discharge standards for treated sewage (GW, or BW+GW) with or without the addition of salt (Table 1). As well, the approach described in FIG. 4A is capable of producing effluent meeting all of the International Maritime Discharge standards for treated OW (Table 2) even for sensitive areas. Furthermore streams of BW+GW and OW can also be treated as shown in FIG. 4B to produce a single final treated effluent, although currently there is not yet a revised standard outlining discharge standards for simultaneous treatment of these streams.

TABLE 1

International Maritime Discharge standards for sewage

| | |
|---|---|
| TSS | <35 mg/L |
| COD | <125 mg/L |
| pH | 6.0-8.5 |
| Fecal Coliform | <100 N/100 mL |
| Free $Cl_2$ residual | <0.5 mg/L |

TABLE 2

International Maritime Discharge standards for oily water

| | |
|---|---|
| Oil & Grease | <15 ppm in ocean |
| | <5 ppm in sensitive area |

For land-based applications, most developed countries have discharge standards for discharge into a combined or domestic sewer system, storm sewer system or into a waterway. These standards vary according to country, state, province and municipality. Thus since discharge standards are highly site and location specific they are not presented in this application. Nevertheless, the stricter land-based discharge standards are similar to the IMO/MARPOL regulations and have in addition other regulated parameters such as heavy metals, phosphates, nitrates, phenols, sulfides, sulfates, THM, and temperature. The WETT approach described in FIG. 4A is also able to meet the stricter land-based discharge standards for wastewater.

The results obtained with lab-scale WETT treatment using EC, EF and EO are presented in Table 3, for three types of model wastewaters developed to closely mimic ship-generated blackwater (BW), graywater (GW) and oily water (OW). The results for blends of these streams are also shown. It can be seen that the lab-scale WETT process was capable of high removal rates for total suspended solids (TSS), COD, and Oil, and the final treated effluent values meet the IMO/MARPOL discharge standards required for these parameters. As well, the results obtained with the pilot-scale WETT treatment of real ship-generated (OW, GW, BW+GW) and domestic (BW+GW) wastewaters using EC, EF, EO and OR are presented in Table 4. WETT treatment meets all the IMO/MARPOL discharge standards for OW and BW+GW.

TABLE 3

TSS, COD and Oil removal results for WETT for model wastewaters simulating ship-generated wastewater

| Measurement | Sample point | GW | OW | BW + GW | BW + GW + OW |
|---|---|---|---|---|---|
| TSS (ppm) | Before EC | 391 | 2942 | 807 | 1367 |
| | After EC | 25 | 114 | 30 | 45 |
| | After EO | 1 | 71 | 0 | 19 |
| COD (ppm) | Before EC | 1337 | 14685 | 1985 | 6670 |
| | After EC | 470 | 300 | 351 | 402 |
| | After EO | 0 | 54 | 1 | 0 |
| OIL (ppm) | Before EC | — | 6200 | — | 6550 |
| | After EC | — | 30 | — | 106 |
| | After EO | — | 4 | — | 12 |

TABLE 4

TSS, COD, BOD, Oil, free and Total $Cl_2$ and Fecal Coliforms removal results for pilot-scale WETT for real ship-generated and domestic wastewaters

| Measurement | Sample point | GW | OW | BW + GW |
|---|---|---|---|---|
| TSS (ppm) | Before EC | 460 | 810 | 750 |
| | After EF | 28.5 | 5.5 | 17 |
| | After EO | — | — | — |
| | After OR | 5 | — | 20 |
| COD (ppm) | Before EC | 2468 | 59100 | 1476 |
| | After EF | 278 | 511 | 143 |
| | After EO | 121 | — | 7 |
| | After OR | 116 | — | 0 |
| BOD (ppm) | Before EC | 163 | — | 556 |
| | After EF | — | — | — |
| | After EO | — | — | — |
| | After OR | <25 | — | 0 |
| OIL (ppm) | Before EC | — | 23,600 | — |
| | After EF | — | 4.2 | — |
| | After EO | — | — | — |
| | After OR | — | 1.21 | — |
| $FCl_2$ ($TCl_2$) (ppm) | Before EC | 0 | 0 (0) | 0 |
| | After EF | 50 | 0 (1) | 0 |
| | After EO | 100 | — | 35 |
| | After OR | 0.2 | 0 (0) | 0.1 |

TABLE 4-continued

TSS, COD, BOD, Oil, free and Total $Cl_2$ and Fecal Coliforms removal results for pilot-scale WETT for real ship-generated and domestic wastewaters

| Measurement | Sample point | GW | OW | BW + GW |
|---|---|---|---|---|
| Fecal Coliforms (CFU/100 ml) | Before EC | — | — | 2E+4 |
| | After EF | | | — |
| | After EO | — | — | — |
| | After OR | 0 | — | 0 |

The WETT process can treat an OW influent containing more than 15 ppm of oil content and the treated effluent will comply with the discharge standard for oil content of less than 15 ppm.

The WETT process can also treat a sewage or graywater influent containing more than 35 ppm Total Suspended Solids (TSS), more than 125 ppm Chemical Oxygen Demand (COD), more than 25 ppm Biological Oxygen Demands (BOD) and more than 100 CFU/100 ml Fecal Coliform (F.C.) and the treated effluent will comply with the MARPOL discharge standards.

Although a dividing wall that allows treating wastewaters of different composition (such as oily water and greywater) is presented in FIG. 4B, it will be appreciated that EC units (as well as EF, EO and OR units) can be placed in combination with a plurality of other similar units either in series or in parallel while sharing some peripheral equipment in order to minimize cost, footprint/bulkiness of the apparatus.

WETT Process Control

Process control is an important aspect of the invention. As mentioned above, the system must be able to adapt to wide variations in contaminant loading caused by variations in influent flowrate and/or quality.

There are many different approaches that could be envisaged, some of which are very complex and expensive. In order to keep the WETT process simple, minimize the cost of sensors and equipment, and successfully meet the treatment requirements for a large number of discharge parameters, the following approaches are selected for each of the principal unit operations but other process control strategies could be applied depending of the mode of operation of each unit:

EC: operate preferably in a once-through mode at constant flowrate; keep current at a constant value or modulate as required based on inlet turbidity and/or oil content as measured by online sensors.

EF: operate preferably in a once-through mode at constant flowrate; keep current at a constant value or modulate as required based on turbidity and/or oil content determined by online sensors.

EO: operate preferably in a batch recirculation mode with constant flowrate, constant current and terminate treatment based on readings from one or a combination of online $CO_2$ gas concentration, ORP, $Cl_2$ and pH sensors.

OR: operate in a batch recirculation or continuous mode with constant flowrate, keep current constant or modulate as required based on the reading from an online Oxidation Reduction Potential (ORP) and/or $Cl_2$ sensor, and terminate treatment based on readings from an online ORP sensor and/or an online $Cl_2$ sensor, or from an online ORP sensor only.

The selected semi-batch approach for operation and control of the unit operations means that a number of holding tanks are required in different parts of the process. The operation and control approach is illustrated in FIG. 1 which shows the location of the principal online sensors utilized for process control but does not depict the holding tanks associated with each treatment unit.

For control purposes, Applicants use a $CO_2$ gas sensor in conjunction with the EO process. Contrary to other control approaches where expensive and sophisticated online COD sensors are used during EO treatment to control the process, the use of a $CO_2$ gas sensor is simple and much less costly. Alternatively, a free chlorine sensor or a pH sensor can be used to indirectly detect the extent of treatment progression in an EO unit.

Figure 5:
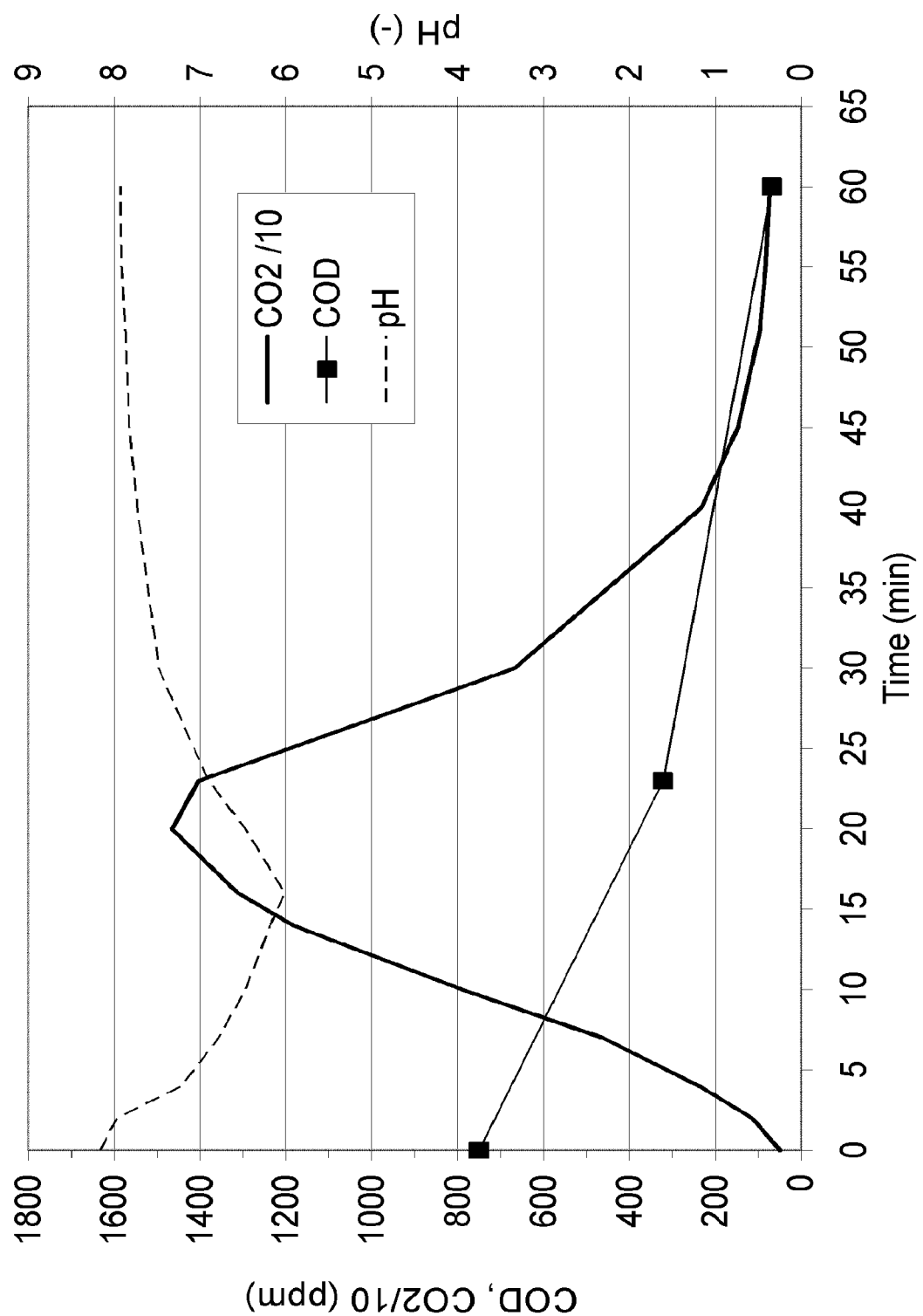
FIG. 5 is a graph showing experimental results from COD, $CO_2$ and pH sensors to highlight their correlation with oxidation treatment progression.

It has been discovered in lab-scale and pilot-scale experiments that, for certain wastewater types, the shape of the $CO_2$ emission curve, in conjunction with pH measurement, gives a clear indication of the time at which most of the reactions occurring during batch EO treatment are completed. This is shown in FIG. 5.

Figure 6:
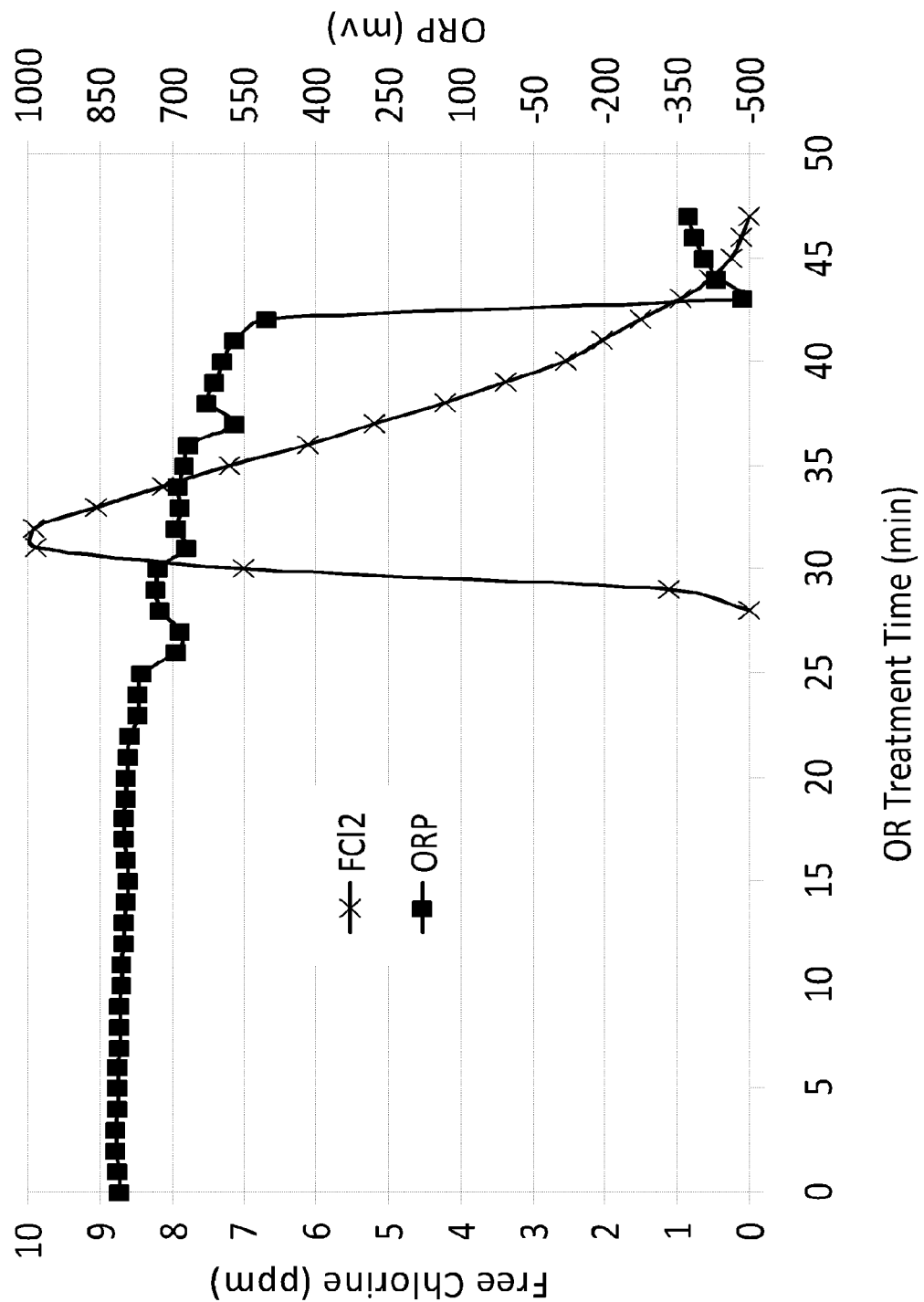
FIG. 6 shows the evolution of ORP and free chlorine in solution during Oxidant Reduction (OR) treatment with the free chlorine sensor activated when ORP value reaches 700 mV.

Another control approach is the use of an online Oxidation-Reduction Potential (ORP) probe for monitoring high concentrations of residual oxidant during the OR process. Once the ORP signal is below a certain value, a conventional chlorine sensor (which cannot be used at high residual oxidant concentrations) is brought online to precisely monitor the progress of the OR process and indicate when it should be terminated. It is also possible to use the ORP probe only to control the OR process once an accurate correlation is made between the ORP level and the $Cl_2$ concentration for a particular solution. The FIG. 6 shows typical measurement of the ORP and free chlorine sensor during OR process.

Treatment for Combined Ship-Generated Wastewaters

For the particular case of wastewaters generated by ships or platforms operating in the ocean (or any combination of wastewaters which resemble BW, GW and OW), an original approach which allows simultaneous treatment of various streams will now be described. It should be noted that simultaneous treatment of various streams is not the norm; typically each wastewater stream requires treatment with a specific type of equipment and process. However an integrated omnivorous system capable of handling all wastewater streams is highly desirable, as evidenced by progress being made in the development of marine discharge standards anticipating the development of such an approach.

FIG. 4B shows the approach for treating the three principal ship-generated wastewater streams, namely BW, GW and OW. It should be noted that not all of the wastewater is treated by all of the WETT unit operations. As well, salt or seawater is only added to the BW+GW blend as required to attain the minimal required solution conductivity for WETT operations. If the BW is gravity-collected using saltwater (as opposed to vacuum-collected with freshwater) a high-saline content stream will be generated and no salt addition is required. The OW stream (for an ocean-going vessel) contains a high proportion of seawater and does not require the addition of salt.

The BW+GW stream and the OW stream are treated in parallel EC/EF units which are joined but do not allow contact between the two streams. These parallel EC/EF units may share some of the system components (for example froth removal system, power supply, etc.) to eliminate duplication of equipment.

EC/EF treatment is normally sufficient to remove most of the oil contained in the OW, which does not go on to EO treatment. This minimizes the EO treatment time and/or equipment size, keeping in mind that this is the most expensive and energy consuming part of the WETT process. Furthermore, diverting the OW stream from the EO is advantageous since the elevated salt content results in excessively high concentrations of bulk oxidant which will require significant effort to decompose in the OR unit. However, the BW+GW stream, with generally much lower salt content, proceeds onwards to EO treatment which is required to reduce its COD.

After the EO unit, the BW+GW stream is blended with the EC/EF-treated OW stream. The residual oxidant contained in the BW+GW stream oxidizes some of the residual COD contained in the OW stream, and reduces the extent of treatment required by the OR unit. Finally, the BW+GW stream and EC/EF-treated OW stream are treated in OR unit to reduce the residual oxidants. Table 5 presents the treatment results for BW+GW and OW streams using the process depicted in FIG. 4B.

TABLE 5

Lab-scale results for WETT treatment of combined OW and BW + GW streams

| Treatment | Influent | Effluent number | Effluent COD (ppm) | Effluent FCl$_2$ (ppm) |
|---|---|---|---|---|
| EC + EF | OW | 1 | 629 | 0 |
| EC + EF + EO | BW + GW | 2 | 44 | 770 |
| Mixing | Effluent 1 + Effluent 2 | 3 | 256 | 114 |
| OR | Effluent 3 | 4 | 217 | 0 |

Finally, the WETT process can treat an influent combining OW and sewage and containing more than 15 ppm oil content, more than 35 ppm TSS, more than 125 ppm COD, more than 25 ppm BOD and more than 100 CFU/100 ml F.C., and the treated effluent will contain oil content lower than 15 ppm, TSS lower than 35 ppm, COD lower than 125 ppm, BOD lower than 25 ppm, pH between 6 and 8.5, Chlorine lower than 0.5 ppm and F.C. lower than 100 CFU/100 ml.

Recycling Hydrated Iron Oxide Fe(OH)$_3$ Particles

It is another aspect of the WETT process to recycle the iron oxide created in the OR unit to enhance the efficiency of the preceding WETT unit operations. In addition to being a well-known adsorbent, iron oxide (for example as created by the addition of ferric chloride (FeCl$_2$)) is a well-known coagulant widely used in wastewater treatment in the same way as alum is used.

Coagulation of Suspended Solids and Contaminants

The recycling/recirculation of iron oxide prior to the EC unit (FIG. 1) assists in the coagulation and flocculation of contaminants and decreases the contribution required from the EC unit. This is of great benefit since the electrical consumption and the frequency of aluminum plate change for the EC unit can be reduced.

Adsorption of Disinfection by-Product Precursors

The creation of disinfection by-products (DBP) during wastewater treatment for potable use (rather than discharge to the environment or the sewer) has become a great concern over the last decades. However, the elimination of oxidants and resulting lack of water sanitation is far more dangerous for human health.

Because of the predominant use of chlorine-based compounds for sanitation of municipal water systems, regulations exist for allowable levels of trihalomethanes (THMs) and haloacetic acids (HAAs) in potable water and are also being considered for many non-potable applications since they are considered to be potentially carcinogenic to humans. These compounds are known to be created by the interaction of the chlorine-based disinfectants with natural organic matter (NOM) contained in the wastewater, which may be of fulvic or humic origin. Similar regulations exist for DBP created with the use of other oxidants based on ozone, chlorine dioxide, bromine etc.

No satisfactory approach has been found to completely eliminate the formation of DBP. Many of the approaches for mitigating the formation of DBP involve the removal of NOM prior to sanitation. Granular activated carbon and other approaches are known to be capable of removing NOM for potable water systems. In particular, the adsorption of NOM on various types of iron oxides has been widely discussed in the literature.

Figure 7:
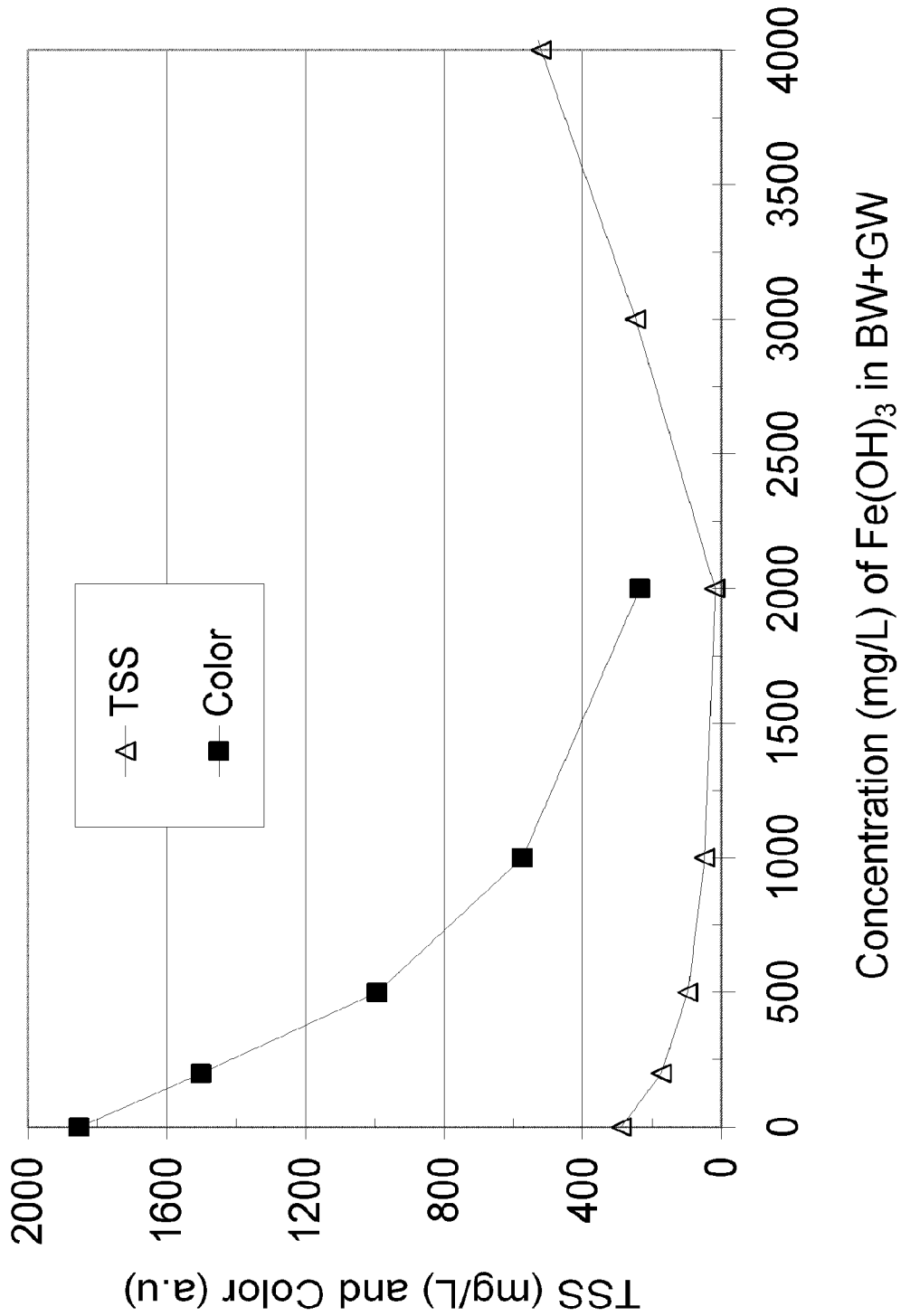
FIG. 7 shows experimental results for Total Suspended Solids (TSS) and color measured in jar tests for blackwater (BW) and graywater (GW) with various levels of metal oxide $Fe(OH)_3$ addition.

The recycling/recirculation of iron oxide prior to the EO unit (FIG. 1) may be more effective in targeting the dissolved NOM which have not been removed by EC/EF, but may also require the use of a clarification or filtration stage prior to or during the EO process. The reduction in DBP formation potential and the reduced treatment required by EO would constitute the major benefits of this option. FIG. 7 shows jar tests (method familiar to those skilled in the art of wastewater treatment) where different amounts of Fe(OH)$_3$ particles are added to ship-generated BW+GW. It can be seen that the Fe(OH)$_3$ is an effective coagulant, as evidenced by the large decrease in total suspended solids (TSS) of the solution. As well, the Fe(OH)$_3$ particles are effective in adsorbing contaminants, as evidenced by the large decrease in solution color, which is often related to the dissolved contaminants and which are not generally removed by coagulation. It can be seen that beyond a certain level (in this case about 2,000 mg/L Fe(OH)$_3$), there is no benefit to further addition of Fe(OH)$_3$ for this particular type of BW+GW wastewater.

Table 6 shows the jar test results obtained for BW+GW when the contribution of an aluminum-based coagulant (as would be generated in EC with aluminum plates) as well as Fe(OH)$_3$ addition is considered. When both coagulants are mixed with the BW+GW, with a concentration of 21 ppm Al$^{3+}$ and 1,000 ppm Fe(OH)$_3$, a TSS value of 17 ppm is obtained. This represents a 50% lower consumption of aluminum-based coagulant (with a corresponding reduction in EC energy consumption) than would be required if only aluminum-based coagulant was used. Furthermore, it can be seen that the use of Fe(OH)$_3$ alone does not reach the low TSS levels that can be obtained with much smaller amounts of aluminum-based coagulant.

TABLE 6

Experimental results for TSS and Color in a BW + GW solution with different Al3+ and Fe(OH)3 concentrations

| | Fe(OH)$_3$ (ppm) | | | | | |
|---|---|---|---|---|---|---|
| | 0 | | 333 | | 1000 | |
| Al (ppm) | TSS (ppm) | Color (a.u.) | TSS (ppm) | Color (a.u.) | TSS (ppm) | Color (a.u.) |
| 0 | 213 | 1564 | 100 | 1015 | 44 | 512 |
| 21 | 51 | 515 | 35 | 457 | 17 | 235 |
| 42 | 20 | 267 | 17 | 241 | 8 | 140 |
| 63 | 9 | 148 | 9 | 149 | 5 | 102 |
| 84 | 7 | 124 | 6 | 119 | 3 | 92 |
| 105 | 9 | 132 | 7 | 121 | N/A | N/A |

Figure 8:
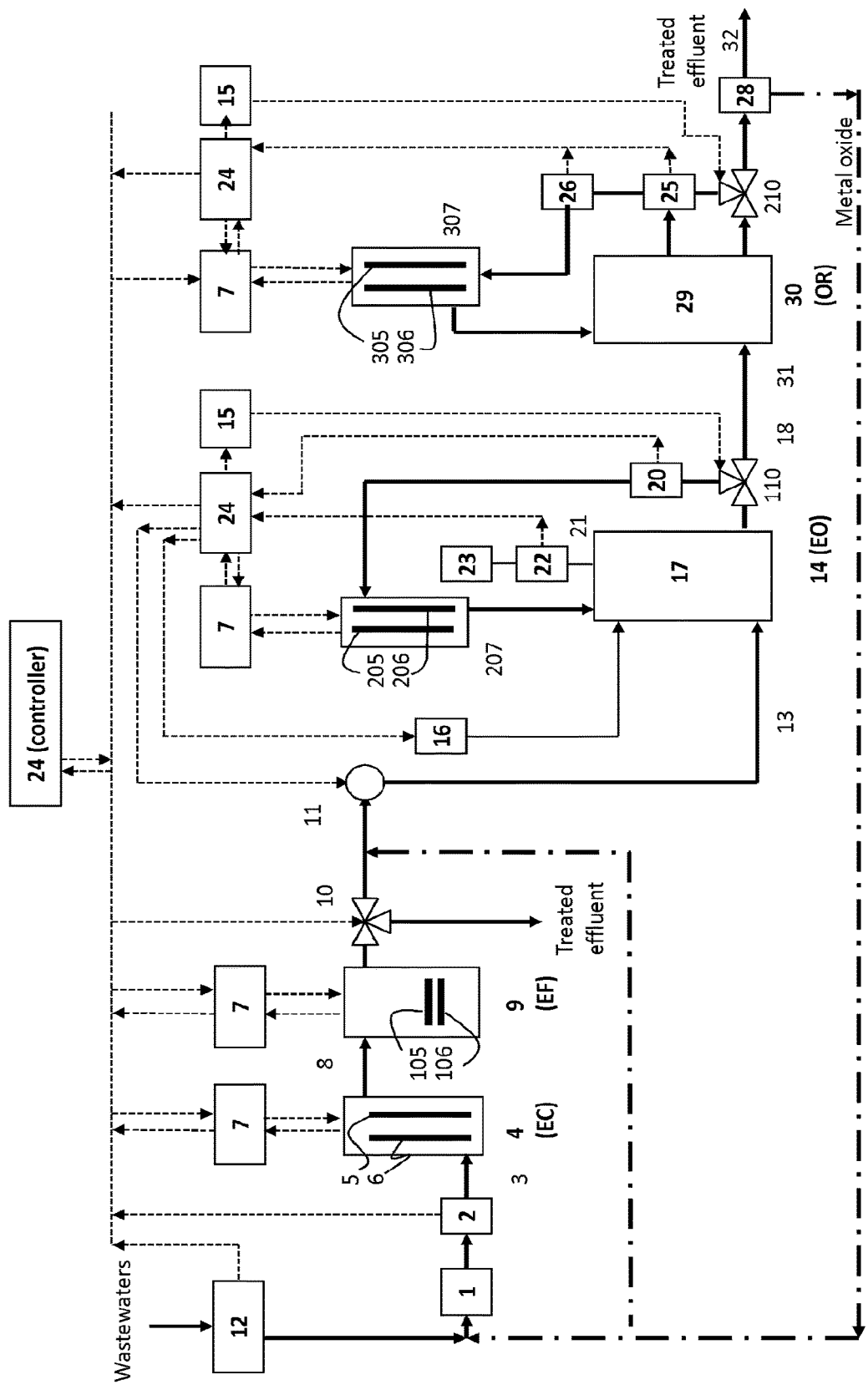
FIG. 8 is a schematic representation of the WETT apparatus including effluent flow circuits and control circuits.

FIG. 8 is a detailed schematic representation of the preferred embodiment of the WETT apparatus including effluent flow circuits (solid lines) and control circuits (dashed lines). In typical cycle of operation, wastewater flows into the apparatus and passes through a selector 12 which allows an operator to select the type of wastewater if it is known. Knowing the composition or origin of the wastewater(s) can allow to implement a predefined treatment protocol. This can also be done automatically through the controller 24 or a plurality of controllers. The wastewater then proceeds though a solid/liquid separation unit 1 which prevents particulate matter of predetermined size from entering into the system, as this could have detrimental effects. The solid/liquid separation unit 1 can be a screen. Wastewater comes in contact with one or more sensors 2 which can sense turbidity or oil to help characterize the wastewater composition and/or type of treatment required. The wastewater then enters the EC unit 4 through the EC unit inlet 3 and encounters an anode 5 and a cathode 6. These electrodes serve as electro-coagulation electrodes and are known in the art. Wastewater (hereinafter referred to as effluent which will be understood as including influent as well as any wastewater flowing through the system) then exits the EC unit and enters the EF unit 9 through the EF unit inlet 8. In the EF unit 9, effluent encounters anode 105 and cathode 106. After exiting the EF unit 9, the effluent encounters a valve 10 which allows for directing the effluent to an outlet as treated effluent or to continue in the system of the present invention, through a pump 11 and to an EO unit 14 through an EO unit inlet 13. The EO unit 14 comprises an oxidation chamber 17 that can form a closed loop circuit using valve 110 and an electrode chamber 207 containing anode 205 and cathode 206. This closed loop further comprises a pH sensor 20 in communication with the controller 24 in order to evaluate the oxidation level of the effluent. The oxidation chamber has a gas outlet 21 for preventing build-up of pressure inside the EO unit 14. Upon exiting the EO unit 14 through the gas outlet 21, the gas comes in contact with a $CO_2$ sensor 22 for quantifying the level of $CO_2$ as this is an indication of treatment completion. Optionally, a $CO_2$ catalyst 23 for quenching $CO_2$ by chemical or enzymatic means can be provided. Once oxidation in the closed circuit is complete as indicated by $CO_2$ evacuated through the gas outlet 21, valve 110 allows effluent to exit through the EO unit outlet 18 and into the OR unit 30. The OR unit 30 consists of an OR vessel 29 which receives effluent from the OR unit inlet 31. The OR unit 30 can form a closed loop system due to the actuation of valve 210. Effluent in the "closed loop" system comes in contact with an ORP sensor 25 and a $Cl_2$ sensor 26 before entering the OR electrode chamber 307. Once OR treatment is complete (i.e. a predetermined level of oxidants has been reached), the valve 210 can direct effluent to a solid/liquid separation unit 28 designed to separate metal oxides from treated effluent, which exits the system through the OR outlet 32. Metal oxides recovered in the solid/liquid separation unit 28 can be recycled to the head of the system, either to a wastewater holding tank upstream of the solid/liquid separation unit 1 as shown or upstream of EC unit 4 (not shown). The metal oxides can also be recycled upstream of the EO unit 14 either before or after the pump 11. It will be appreciated that all units, sensors, electrodes, valves and pumps are in communication with controller 24 (see dashed lines) such that controller 24 receives input from sensors and sends instructions to actuators. All unit operations are powered by a power source 7 which can be one single power source or many individual power sources as shown in FIG. 8.

In an alternate embodiment, the OR unit can function exclusively by providing a UV source rather than using sacrificial electrodes. In such an apparatus, the ultraviolet source can replaced the electrode chamber 307. It will be appreciated that if the oxidant removal capability is provided by a source of UV radiation rather than electrodes, the OR unit 30 could not require an OR vessel 29 as the UV source can be provided directly inside the effluent conduits. It will be also appreciated that if UV radiation is used instead of sacrificial electrodes, the solid/liquid separation unit 28 is not required and no recycling of metal oxide is necessary.

In another embodiment, the OR unit 30 can be provided in a closed loop system in combination with the EO unit 14. In such an embodiment, contaminants are oxidized upon passing through the electrode chamber 207 but all unused or unreacted oxidants can be removed directly in the closed-loop system. It will be appreciated that the OR unit of this closed-loop system can be the standard sacrificial electrode type or the ultraviolet based oxidant removal technique.

It will be appreciated by those skilled in the art that a high number of permutations are possible for this system and that such permutations would not depart from the essence of the invention.

What is claimed is:

1. A process for treating wastewater comprising at least one of blackwater and graywater, the process comprising:
    removing suspended solids in said wastewater using metal ions liberated by at least one metal anode electrode in an electro-coagulation unit and hydrogen gas bubbles by at least one cathode to coagulate contaminants and cause them to float and to form a froth, wherein most of total suspended solids and dissolved solids in said wastewater are removed as a froth in said electro-coagulation unit;
    electro-oxidizing organic contaminants including any suspended solids and dissolved solids remaining in said wastewater discharged from said electro-coagulation unit using hydroxyl radicals generated at the surface of at least one boron doped diamond coated anode of an electro-oxidation unit, thereby converting said contaminants to a gas comprising hydrogen and carbon dioxide, without removal of any total suspended solids through floatation in said electro-oxidation unit, and discharging wastewater from said electro-oxidation unit into an oxidant removal unit; and
    decomposing residual oxidants remaining in said wastewater using iron ions liberated by at least one iron electrode of said oxidant removal unit, thereby producing iron oxide particles that can be separated from said wastewater to generate effluent wastewater, wherein all treatment agents acting on said contaminants are generated in-situ, in said wastewater,
    wherein said effluent wastewater is discharged to the environment directly from the oxidant removal unit.

2. The process as defined in claim 1, wherein said electro-coagulation unit operates in a continuous mode.

3. The process as defined in claim 1, wherein said electro-coagulation unit operates in a batch mode.

4. The process as defined in claim 1, wherein said electro-oxidation unit operates in a continuous mode.

5. The process as defined in claim 1, wherein said electro-oxidation unit operates in a batch recirculation mode.

6. The process as defined in claim 1, wherein said oxidant removal unit operates in a continuous mode.

7. The process as defined in claim 1, wherein said oxidant removal unit operates in a batch recirculation mode.

8. The process as defined in claim 1, wherein more than 90% of total suspended solids in said wastewater are removed in said electro-coagulation unit.

9. The process as defined in claim 1, wherein said wastewater discharged from said electro-oxidation unit has less than 35 mg/L of total suspended solids and less than 125 mg/L of chemical oxygen demand.

10. The process as defined in claim 1, wherein said effluent wastewater discharged from said oxidant removal unit has less than 0.5 mg/L of residual chlorine oxidant.

11. The process as defined in claim 10, wherein said wastewater is black water as an influent and is discharged from said electro-oxidation unit with a fecal coliform content of less than 100 CFU/100 mL.

12. The process as defined in claim 1, wherein said wastewater discharged from said electro-oxidation unit has less than 35 mg/L of total suspended solids and less than 125 mg/L of chemical oxygen demand, and said effluent wastewater discharged from said oxidant removal unit has less than 0.5 mg/L of residual chlorine oxidant.

13. The process as defined in claim 1, wherein said wastewater is black water as an influent and is discharged from said electro-oxidation unit with a fecal coliform content of less than 100 CFU/100 mL.

14. The process as defined in claim 1, wherein said effluent wastewater is discharged to the marine environment directly from the oxidant removal unit.

15. A process for treating wastewater comprising at least one of blackwater and graywater, the process comprising:
removing suspended solids in said wastewater using metal ions liberated by at least one metal anode electrode in an electro-coagulation unit and hydrogen gas bubbles by at least one cathode to coagulate contaminants and cause them to float and to form a froth, wherein most of total suspended solids in said wastewater are removed in said electro-coagulation unit and most dissolved solids in said wastewater are removed as a froth in said electro-coagulation unit;
electro-oxidizing organic contaminants including any suspended solids and dissolved solids remaining in said wastewater discharged from said electro-coagulation unit using hydroxyl radicals generated at the surface of at least one boron doped diamond coated anode of an electro-oxidation unit, thereby converting said contaminants to a gas comprising hydrogen and carbon dioxide, and discharging wastewater having less than 35 mg/L of total suspended solids and less than 125 mg/L of chemical oxygen demand from said electro-oxidation unit into an oxidant removal unit; and
decomposing residual oxidants remaining in said wastewater using iron ions liberated by at least one iron electrode of said oxidant removal unit, thereby producing iron oxide particles that can be separated from said wastewater to generate effluent wastewater having less than 0.5 mg/L of residual chlorine oxidant, wherein all treatment agents acting on said contaminants are generated in-situ, in said wastewater,
wherein said effluent wastewater is discharged to the environment directly from the oxidant removal unit.

16. The process as defined in claim 15, wherein said electro-coagulation unit operates in a continuous mode.

17. The process as defined in claim 15, wherein said electro-coagulation unit operates in a batch mode.

18. The process as defined in claim 15, wherein said electro-oxidation unit operates in a continuous mode.

19. The process as defined in claim 15, wherein said electro-oxidation unit operates in a batch recirculation mode.

20. The process as defined in claim 15, wherein said oxidant removal unit operates in a continuous mode.

21. The process as defined in claim 15, wherein said oxidant removal unit operates in a batch recirculation mode.

22. The process as defined in claim 15, wherein said effluent wastewater is discharged to the marine environment directly from the oxidant removal unit.

* * * * *